Aug. 4, 1942. J. L. MORRIS Re. 22,156

PIPE COUPLING AND PIPE CLAMP

Original Filed June 7, 1939 2 Sheets-Sheet 1

INVENTOR
Jolly L. Morris
By Green & McCallister
His Attorneys

Aug. 4, 1942. J. L. MORRIS Re. 22,156

PIPE COUPLING AND PIPE CLAMP

Original Filed June 7, 1939 2 Sheets-Sheet 2

INVENTOR
Jolly L. Morris
By Green & McCallister
His Attorneys

Reissued Aug. 4, 1942

Re. 22,156

UNITED STATES PATENT OFFICE 22,156

PIPE COUPLING AND PIPE CLAMP

Jolly L. Morris, Houston, Pa., assignor of three-fourths to Frank W. Finley, Pittsburgh, Pa.

Original No. 2,227,551, dated January 7, 1941, Serial No. 277,830, June 7, 1939. Application for reissue January 9, 1942, Serial No. 426,144

5 Claims. (Cl. 285—194)

This invention relates to pipe couplings and has particular reference to couplings employed with pipe lines used for conducting water, gas or other liquids and fluids.

A primary object of the invention is to provide a simple and effective pipe coupling which is capable of being easily applied to sections of pipe to be coupled and which is capable of producing a fluid-tight joint between such pipe sections.

A further object is to provide such a coupling which can be easily and effectively employed in connection with pipe sections having either threaded or unthreaded ends.

Another object of the invention is to provide a pipe coupling which may be easily and effectively employed for joining old pipes without the necessity of rethreading the old pipe even though the same may be pitted and battered.

A still further object of the invention is to provide a coupling which may be factory-assembled and when so assembled easily and effectively applied to the end of pipes to be coupled.

A further object is to provide a pipe coupling which is of light weight and is inexpensive to manufacture, but which is highly effective in coupling together and producing a fluid-tight joint between abutting pipe sections of the same external diameter.

A still further object is to provide a pipe coupling which may be used in coupling together pipe sections such as are used in mines and which may be made of wood, fiber or other materials.

Other objects and advantages derived from my invention will appear from the following detailed description and claims, taken in connection with the accompany drawings, in which similar reference numerals indicate corresponding parts.

Figure 1:
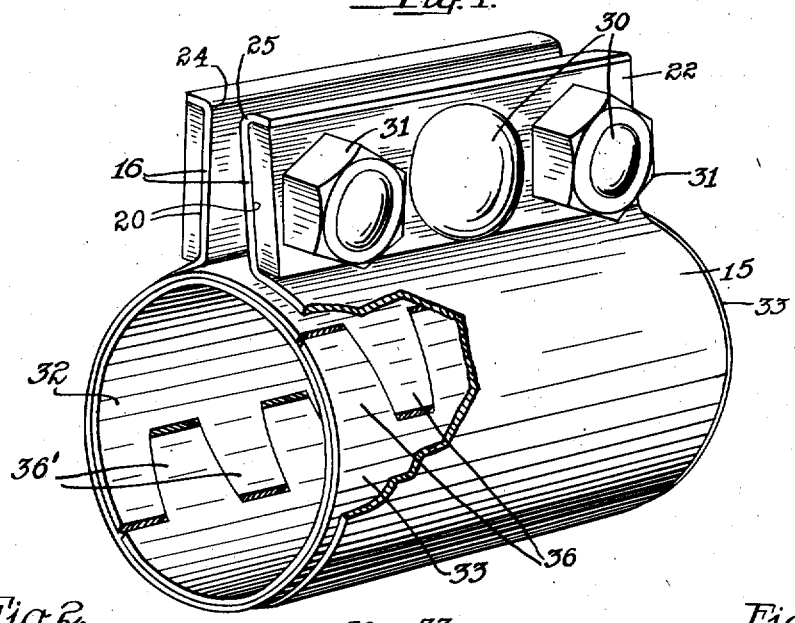
Figure 1 is a perspective view of a pipe coupling embodying my invention, showing the shell member of the coupling broken away at one end to expose the part located beneath it.
Figure 2:
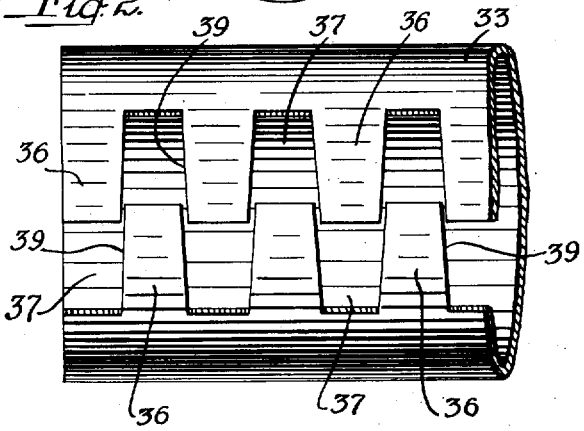
Figure 2 is a fragmental side elevation of a metallic sleeve constituting a part of the coupling illustrated and may also be employed as illustrating a gasket which also constitutes a part of such coupling.
Figure 3:
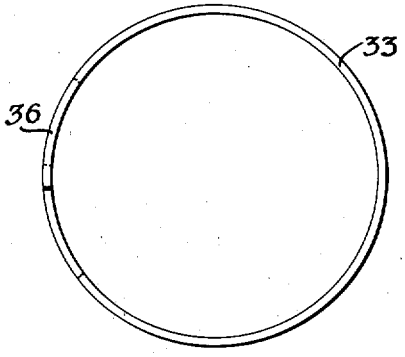
Figure 3 is an end view of either the sleeve or the gasket illustrated in Figure 2.

With reference to Figures 1, 2 and 3 of the drawings, the coupling there illustrated includes a substantially cylindrical shell 15, preferably made of rust-resisting sheet material, and provided along each longitudinal edge with a bent-up portion or flange 16. Each such flange extends throughout the entire length of the shell 15 and projects approximately radially with relation thereto. The free end of each such flange is bent outwardly (with relation to the other flange) to form a channel-like recess 20 adapted to receive a reinforcing steel strip 22 which may be spot welded or otherwise permanently secured in place on the flange.

It will be noted that the two flanges 16 are toed inwardly with relation to each other (see Figure 1), so that the outer edges 24 and 25 thereof will meet first when tightening the pipe coupling around pipe ends 28 and 29 by means of bolts 30 and their associated nuts 31.

Figures 2 and 3 illustrate a cylindrical metal sleeve 33 which, as shown in Figure 1, constitutes a part of my improved pipe coupling. These figures may also be considered as illustrating a cylindrical or tubular gasket 32 which constitutes a part of the coupling here illustrated as my invention. The sleeve 33 and the gasket 32 are of substantially identical form and for that reason I have not thought it necessary to illustrate both of them.

The sleeve 33 is of cylindrical shape, is open at both ends and split lengthwise. Each longitudinal edge, occasioned by the lengthwise splitting is provided with a series of circumferentially projecting fingers 36 all of substantially similar form and which are separated from each other by correspondingly shaped and similarly dimensioned recesses 37. The fingers 36 formed on one edge are adapted to interfit with those formed on the other edge, i. e., the fingers 36 of one series are adapted to extend into the recess 37 of the other series as shown in Figure 2.

Figure 6:
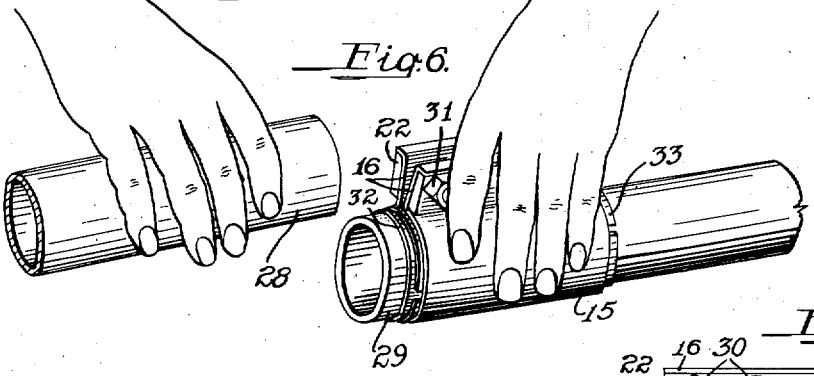
Figure 6 is a further view of the pipe coupling of Figure 1 and illustrates the operation of sliding the completely assembled coupling over the end of a pipe as a preliminary to coupling two such pipes together.

Each finger 36 and recess 37 is slightly tapered as along the edges indicated by the numeral 39 so that the side edges of the opposed groups of fingers come in close abutment (see Figure 1) when the pipe coupling is tightened and therefore radially contracted over the ends of pipes, such as the pipe 28 and 29 illustrated in Figure 6.

The cylindrical gasket 32 is substantially identical in form and outline with the metallic sleeve 33 except that the gasket is of smaller diameter than the sleeve and fits into the sleeve. The difference in diameter is such as to take care of the thickness of the gasket material. The gasket 32, like the sleeve 33, is formed with opposed groups of fingers 36' similar to the fingers 36. These fingers 36' are adapted to interfit and cooperate in the assembled and operating coupling, as described in connection with the fingers 36 of the sleeve 33.

Figure 6 of the drawings illustrates the coupling of Figure 1 completely assembled but in the spread or untightened position and slipped over the pipe 29. This figure illustrates in part the operation of positioning the coupling as a preliminary to securing the abutting ends of two pipes 28 and 29 together. After the coupling is slipped onto one such pipe, for example the pipe 29, the other pipe 28 is moved into axial alignment and abutting engagement with the pipe 29 and the coupling is then slid back to a position over the end of the pipe 29 such that it also encircles the end of pipe 28 and the abutting ends of the two pipes 28 and 29 are located midway between the longitudinal ends of the shell 15. After the coupling is so positioned, the nut and bolt assemblies 30—31 are tightened, thereby radially contracting the cylindrical shell 15 and forcing the gasket 32, the metallic sleeve 33 and the shell 15 into clamping engagement with each other and with the abutting ends of the pipes 28 and 29.

Figure 7:
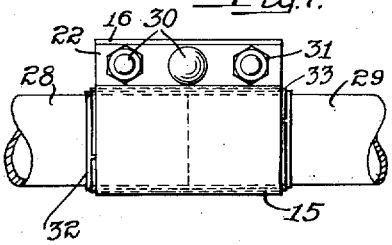
Figure 7 illustrates, on a reduced scale, the coupling of Figure 1 applied to the abutting ends of two pipe sections.

Figure 7 is a side elevation on a reduced scale of the coupling of Figure 1 shown in place and clamped in position on the abutting ends of two pipe sections such, for example, as the pipes 23 and 29 of Figure 6.

Figure 4:
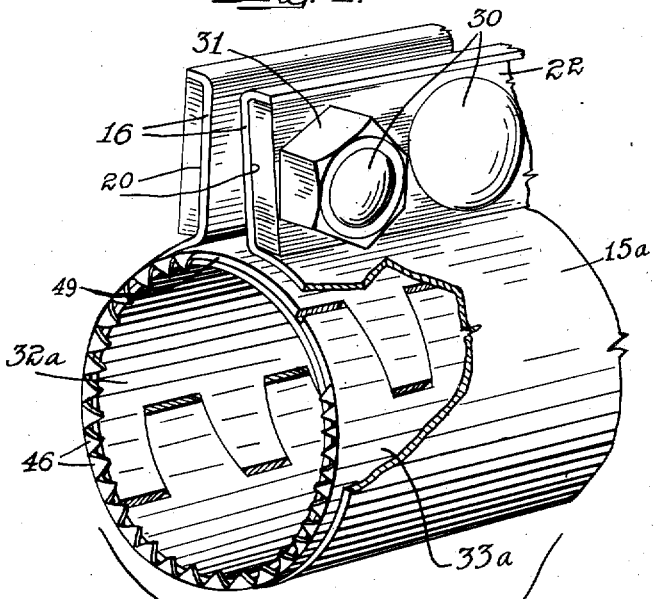
Figure 4 is a fragmentary perspective view of a modified form of the pipe coupling shown in Figure 1 and in this view a part of the shell of the coupling is shown broken away for the purpose of exposing the part located beneath it.
Figure 5:
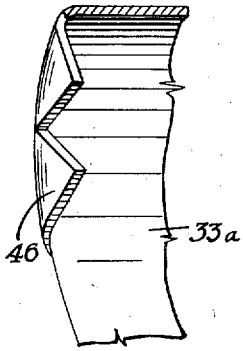
Figure 5 is an enlarged perspective view showing a portion of a serrated sleeve constituting a part of the coupling shown in Figure 4.

A modification of the coupling of Figure 1 is shown in Figure 4. The coupling there illustrated includes a shell 15*a* similar in all respects to the shell 15 and having formed thereon the locking flanges 16 with which the tightening and locking bolts 30 are associated. The coupling also includes a gasket 32*a* which is in all respects similar to the gasket 32 of Figure 1. A metallic sleeve 33*a* overlies the gasket 32*a* and is located between it and the shell 15*a*.

The metallic sleeve 33*a* is in all respects similar to the metallic sleeve 33 except it is provided at each end thereof with serrations 46 which extend substantially radially. In the assembled and operative coupling these serrations are in the form of inwardly projecting triangular points which in effect constitute a serrated flange for each end of the sleeve. In the assembled coupling illustrated in Figure 4 these flanges are contiguous with the adjacent ends of the gasket 32*a* and overlap those ends. As shown at 49, the serrations are omitted from portions of the sleeve adjacent the longitudinally extending edges thereof.

As is well known, pipe lines, such as those employed in mines, are ordinarily subjected to highly corrosive conditions and for that reason steel or iron pipes, ordinarily used, are sometimes replaced by pipe lines made of wood, fiber or other suitable materials. These non-metallic pipes are frequently exteriorly protected with a heavy coat of pitch or asphalt and it is for that reason that the pipe coupling shown in Figure 4 has been produced. When applied to a pipe line covered with pitch or asphalt, it will prevent slipping and even though the pipe line is conducting a high pressure fluid.

In employing the pipe coupling shown in Figure 4, the completely assembled coupling is applied to the abutting ends of the pipe as previously described in connection with the pipes 28 and 29 illustrated in Figure 6. It will be apparent that at the time the coupling is applied to and clamped over the asphalt or pitch-covered pipe ends, the serrations 46 are bent inwardly forming the serrated flange heretofore described. These serrations are provided with sharp points and are preferably formed integrally with the sleeve 33*a*. Where a pipe coupling, such as illustrated in Figure 4, is employed with pipe lines made of wood or other acid-resisting material, it embraces and effectually engages the abutting pipe ends and prevents them from shifting because the serrations 46 bite into the pipe ends when the coupling is tightened.

The gasket used in connection with the pipe couplings here illustrated may be rubber, lead, or other similar material according to the purposes for which the line of pipe is employed.

With the foregoing description, taken in connection with the drawings, the construction of the devices and the method of application will be readily apparent to those skilled in the art to which the invention appertains, and while describing the principle of operation of the invention together with the devices which are now considered to be the best embodiment thereof, it will be understood that various changes in form, proportions and minor details of construction may be resorted to without departing from the principle or sacrificing any of the advantages of the invention as the invention is defined in the appended claims.

Having thus described my invention, what I claim is:

1. A pipe coupling adapted to be positioned over the abutting ends of axially aligned pipes of substantially the same external diameter and when so positioned to clamp such pipes together and to form a fluid-tight joint between the abutting ends thereof, comprising a tubular gasket overlying the abutting ends of said pipe and slit from end to end with the slit edges thereof having circumferentially extending, interfitting tapered fingers formed thereon, a cylindrical longitudinally slit metallic sleeve having circumferentially extending interfitting tapered fingers formed along the longitudinal edges thereof, said sleeve overlying said gasket and in contact therewith, with the interfitting fingers thereof spaced circumferentially from the interfitting fingers of said gasket, a longitudinally slit substantially cylindrical metal shell surrounding said sleeve with the inner peripheral surface thereof engaging and confining the interfitting fingers of said sleeve throughout the longitudinal extent of said shell, an outstanding flange formed along each longitudinal edge of said shell and means engaging said flanges for contracting said shell and thereby forcing the tapered edges of said interfitting fingers into wedging engagement with each other and for forcing said gasket, said sleeve and said shell into clamping engagement with the abutting ends of such pipes.

2. A pipe coupling adapted to be positioned over the abutting ends of axially aligned pipes of substantially the same external diameter and when so positioned to clamp such pipes together and to form a fluid-tight joint between the abutting ends thereof, comprising a tubular gasket split from end to end, overlying and encircling the abutting ends of said pipes and engaging the external surface of each such pipe throughout the peripheral extent thereof and having circumferentially extending, interfitting fingers formed on the longitudinally extending edges thereof, a longitudinally slit cylindrical metallic sleeve overlying said gasket and in contact therewith, with the split edges thereof free to move toward and away from each other in response to a radial enlargement and contraction of said shell, an inturned flange formed on each longitudinal end of said sleeve located contiguous with the adjacent end of said gasket, a longitudinally split substantially cylindrical metallic shell surrounding said sleeve with its inner peripheral surface engaging and confining the longitudinal edges thereof throughout the longitudinal extent of said shell and means engaging said shell for contracting it and thereby moving the slit edges of said shell toward each other and forcing the shell, the sleeve and the gasket into clamping engagement with the abutting ends of such pipes.

3. A pipe coupling adapted to be positioned over the abutting ends of axially aligned pipes of substantially the same external diameter and when so positioned to clamp such pipes together and form a fluid-tight joint between the abutting ends thereof, comprising a tubular gasket overlying the abutting ends of said pipes and split longitudinally from end to end and having circumferentially extending interfitting fingers formed on the split edges thereof, a one-piece longitudinally split metallic sleeve of substantially uniform section throughout overlying said gasket and in contact therewith throughout substantially the entire extent thereof with the split edges thereof free to move relatively to each other and spaced circumferentially from the interfitting fingers of said gasket, a one-piece longitudinally slit substantially cylindrical metallic shell surrounding said sleeve with its inner peripheral surface engaging and confining the longitudinal edges of the sleeve throughout substantially the entire length of such edges and means engaging said shell for contracting it and thereby moving the longitudinal edges of said sleeve toward each other and forcing said shell, said sleeve and said gasket into clamping engagement with the abutting ends of such pipes.

4. A pipe coupling adapted to be positioned over the abutting ends of pipes of substantially the same external diameter and when so positioned to align such pipes and clamp the same together and form a fluid-tight joint between the abutting ends thereof, comprising a tubular gasket overlying the abutting ends of such pipes, in engagement with substantially equal portions of the external surface of each such pipe throughout the peripheral extent of each such surface and split from end to end with circumferentially extending interfitting tapered fingers formed on the longitudinal edges thereof, a one-piece cylindrical metallic sleeve of substantially uniform thickness throughout split from end to end and surrounding the abutting ends of such pipes and overlying said gasket with its longitudinal edges in contact with said gasket and circumferentially spaced from the interfitting fingers thereof and free to move toward and away from each other in response to radial contraction and enlargement of said sleeve, a one-piece longitudinally split metal shell of substantially cylindrical form surrounding the abutting ends of said pipes overlying said sleeve and contacting with the external surface of said sleeve throughout substantially the entire extent thereof, and means for contracting said shell and thereby moving the longitudinally extending edges of said sleeve toward each other and forcing said shell, said sleeve and said gasket into clamping engagement with the ends of both such pipes.

5. In a pipe coupling adapted to be positioned over the abutting ends of axially aligned pipes of substantially the same external diameter and when so positioned to clamp said pipes together, comprising in combination a tubular gasket split from end to end overlying and encircling the abutting ends of said pipes and engaging a substantial portion of the external surface of each such pipe throughout the peripheral extent thereof and having circumferentially extending interfitting tapered fingers formed on the longitudinal edges thereof, a longitudinally split substantially cylindrical metallic sleeve having circumferentially extending interfitting fingers formed on the edges thereof, said sleeve overlying said gasket and in intimate contact therewith throughout substantially the entire extent thereof and with the longitudinal edges thereof free to move relatively with relation to each other and spaced circumferentially from the interfitting fingers of said gasket, a one-piece substantially cylindrical longitudinally split metallic shell surrounding said sleeve, in contact therewith and confining the longitudinal edges thereof throughout substantially the entire extent of each such edge and means engaging said shell for contracting it and thereby moving the longitudinal edges of the sleeve toward each other and forcing the tapered edges of the interfitting fingers of said gasket into wedging engagement with each other and forcing said shell, said sleeve and said gasket into clamping engagement with the abutting end of said pipes.

JOLLY L. MORRIS.